(12) United States Patent
Magnusson et al.

(10) Patent No.: US 11,015,374 B2
(45) Date of Patent: May 25, 2021

(54) DOOR LOCKING DEVICE FOR LOCKING A VEHICLE DOOR

(71) Applicant: Scania CV AB, Södertälje (SE)

(72) Inventors: Rickard Magnusson, Tullinge (SE); Christer Lang, Kolmården (SE)

(73) Assignee: Scania CV AB, Södertälje (SE)

( * ) Notice: Subject to any disclaimer, the term of this patent is extended or adjusted under 35 U.S.C. 154(b) by 653 days.

(21) Appl. No.: 15/561,343

(22) PCT Filed: Jun. 2, 2016

(86) PCT No.: PCT/SE2016/050519
§ 371 (c)(1),
(2) Date: Sep. 25, 2017

(87) PCT Pub. No.: WO2016/204674
PCT Pub. Date: Dec. 22, 2016

(65) Prior Publication Data
US 2018/0058109 A1    Mar. 1, 2018

(30) Foreign Application Priority Data
Jun. 17, 2015  (SE) .................................. 1550834-4

(51) Int. Cl.
*E05B 77/28* (2014.01)
*E05B 83/42* (2014.01)
(Continued)

(52) U.S. Cl.
CPC ............ *E05B 77/283* (2013.01); *E05B 77/38* (2013.01); *E05B 77/44* (2013.01); *E05B 83/42* (2013.01);
(Continued)

(58) Field of Classification Search
CPC ............. E05B 15/0086; E05B 63/0004; E05B 1/0015; E05B 2001/0023; E05B 77/44;
(Continued)

(56) References Cited

U.S. PATENT DOCUMENTS 609,214  A  *  8/1898  Shaw ...................... E05C 17/32
292/263
924,081  A  *  6/1909  Loev ....................... E05C 17/32
292/263
(Continued)

FOREIGN PATENT DOCUMENTS

| CH | 354904 A * | 6/1961 | ............. E05C 19/14 |
| CN | 202689737 U | 1/2013 | |

(Continued)

OTHER PUBLICATIONS

Machine Translation of JP 2007146454 A, 2020, pp. 1-5 (Year: 2020).*

(Continued)

*Primary Examiner* — Christine M Mills
(74) *Attorney, Agent, or Firm* — Moore & Van Allen PLLC; W. Kevin Ransom

(57) ABSTRACT

Disclosed is a door locking device for manually/physically locking a vehicle door from inside a vehicle, especially a cab door of a truck, comprising a housing including locking members movable between an unlocked position and a locked position. A first lever arm is partly rotatable connected to the housing and a second lever arm is partly rotatable connected to the other end of the first lever arms. A first spring is striving to keep the first lever arm onto or in the housing and a second spring is striving to keep the second lever arm against or in level with the first lever arm and/or in the housing. The second lever arm is provided with a recess by which the first and second lever arms may be pulled out, operated, from their folded position on/in the
(Continued)

housing and/or door, by the user/driver, and hooked on/around a rigid locking element/handle.

20 Claims, 6 Drawing Sheets

(51) Int. Cl.
| | |
|---|---|
| *E05C 3/04* | (2006.01) |
| *E05C 19/14* | (2006.01) |
| *E05B 77/44* | (2014.01) |
| *E05B 77/38* | (2014.01) |
| *E05B 63/00* | (2006.01) |
| *E05B 1/00* | (2006.01) |
| *B60J 5/04* | (2006.01) |

(52) U.S. Cl.
CPC .............. *E05C 3/04* (2013.01); *E05C 19/14* (2013.01); *B60J 5/0497* (2013.01); *E05B 1/0015* (2013.01); *E05B 63/0004* (2013.01); *E05Y 2900/516* (2013.01); *E05Y 2900/531* (2013.01)

(58) Field of Classification Search
CPC ........ E05B 77/283; E05B 77/38; E05B 83/42; E05B 17/0025; E05C 3/04; E05C 3/044; E05C 17/04; E05C 17/042; E05C 17/30; E05C 17/32; E05C 17/46; E05C 19/14; E05C 19/10; E05C 19/105; E05C 19/12; E05C 19/145; E05C 21/005; Y10T 292/243; Y10T 292/03; Y10T 292/323; Y10T 292/444; Y10T 292/57; Y10T 292/71; Y10T 292/282; Y10T 292/0917; Y10T 292/0936; Y10T 292/0946; Y10T 292/0949; Y10S 292/01; Y10S 292/05; Y10S 292/06; Y10S 292/42; Y10S 292/63; Y10S 292/65; Y10S 292/33; Y10S 292/49; E05Y 2900/516; E05Y 2900/531; B60J 5/0497
USPC ............. 292/259 A, 1, 285, 304, 336.3, 342, 292/DIG. 1, DIG. 5, DIG. 6, DIG. 42, 292/DIG. 63, DIG. 65; 70/93; 296/146.9, 146.1
See application file for complete search history.

(56) References Cited

U.S. PATENT DOCUMENTS

| | | | | | |
|---|---|---|---|---|---|
| 1,029,693 | A | * | 6/1912 | Klein ...................... | E05C 17/32 292/263 |
| 1,744,456 | A | * | 1/1930 | Elling ..................... | E05C 17/32 292/263 |
| 2,407,900 | A | * | 9/1946 | Irving ..................... | E05C 17/32 70/93 |
| 2,829,912 | A | * | 4/1958 | Koch ...................... | E05C 19/14 292/114 |
| 3,924,886 | A | * | 12/1975 | Markovitch ............ | E05C 17/04 292/263 |
| 4,008,584 | A | * | 2/1977 | Wingert .................. | E05B 65/52 70/73 |
| 4,057,020 | A | * | 11/1977 | Halliar .................... | F16J 13/18 105/377.11 |
| 4,391,463 | A | * | 7/1983 | Costa Bastart ......... | E05C 17/32 292/263 |
| 4,570,816 | A | * | 2/1986 | Ferris ..................... | B65D 90/10 105/308.2 |
| 4,762,351 | A | * | 8/1988 | Bowman ................. | E05C 17/32 292/263 |
| 4,804,215 | A | * | 2/1989 | Bisbing .................. | E05C 19/14 292/113 |
| 4,828,298 | A | * | 5/1989 | Bisbing .................. | E05C 19/14 292/113 |
| 4,830,413 | A | * | 5/1989 | Bisbing .................. | E05C 19/14 292/247 |
| 4,982,474 | A | * | 1/1991 | Kjellstrom ............. | E05C 17/04 16/82 |
| 5,216,905 | A | * | 6/1993 | Sersch ................... | E05C 19/145 70/312 |
| 5,461,892 | A | * | 10/1995 | Hsieh ..................... | E05C 19/145 292/247 |
| 5,547,234 | A | * | 8/1996 | Kinnanen ............... | B60J 7/1851 292/112 |
| 5,605,365 | A | * | 2/1997 | George ................... | E05C 17/166 292/263 |
| 5,727,823 | A | | 3/1998 | Wiley | |
| 6,145,351 | A | * | 11/2000 | Levenson ............... | E05B 45/06 292/263 |
| 6,219,880 | B1 | * | 4/2001 | Worden .................. | A47L 5/365 15/327.6 |
| 6,367,852 | B1 | * | 4/2002 | Aspenwall ............. | E05B 65/0894 292/281 |
| 6,619,708 | B1 | | 9/2003 | Naylor | |
| 7,568,739 | B2 | * | 8/2009 | Lee ........................ | B25H 3/02 220/324 |
| 8,567,828 | B2 | * | 10/2013 | Andren .................. | A45C 13/02 292/66 |
| 8,939,476 | B2 | * | 1/2015 | Tang ....................... | E05C 17/32 292/251.5 |
| 9,222,291 | B2 | * | 12/2015 | Kakita .................... | E05C 19/14 |
| 2007/0056231 | A1 | * | 3/2007 | DiMario ................. | E05C 3/004 52/204.53 |
| 2012/0056450 | A1 | * | 3/2012 | DiMario ................. | B60J 1/006 296/224 |

FOREIGN PATENT DOCUMENTS

| | | | |
|---|---|---|---|
| CN | 103255961 A | 8/2013 | |
| CN | 103541613 A | 1/2014 | |
| DE | 102011000378 A1 * | 8/2012 | .............. F16B 2/185 |
| DE | 20200920 U1 | 1/2013 | |
| EP | 1153779 A2 * | 11/2001 | ............ B60J 5/0497 |
| EP | 2687658 A2 | 1/2014 | |
| JP | 2007146454 A * | 6/2007 | |
| JP | 2007146454 A | 6/2007 | |
| TW | 200730104 A | 8/2007 | |
| WO | 2006083225 A1 | 8/2006 | |
| WO | 2007120040 A1 | 10/2007 | |
| WO | 2014199191 A1 | 12/2014 | |
| WO | WO-2014199191 A1 * | 12/2014 | .............. E05B 77/44 |
| WO | WO-2019151924 A1 * | 8/2019 | .............. E05B 77/30 |

OTHER PUBLICATIONS

Chinese Office Action for Chinese Patent Application No. 2016800247302 dated Dec. 11, 2018.
European Search Report for European Patent Application No. 16 81 2042 dated Jan. 2, 2019.
Supplementary European Search Report for European Patent Application No. 16 81 2042 dated Dec. 17, 2018.
Korean Office Action for Korean Patent Application No. 10-2018-7000627 dated Feb. 11, 2019.
Swedish Office Action for Swedish Patent Application No. 1550834-4 dated Dec. 4, 2015.
International Preliminary Report on Patentability for European Patent Application No. 16 81 2042 dated Dec. 19, 2017.
International Search Report for PCT/SE2016/050519 dated Sep. 2, 2016.
Written Opinion of the International Searching Authority for PCT/SE2016/050519 dated Sep. 2, 2016.
Notification of Transmittal of the International Search Report and the Written Opinion of the International Searching Authority, or the Declaration for PCT/SE2016/050519 dated Sep. 2, 2016.

(56) References Cited

OTHER PUBLICATIONS

Scania CV AB, Brazilian Patent Application No. BR112017020756-7, Office Action, dated Jun. 16, 2020.

* cited by examiner

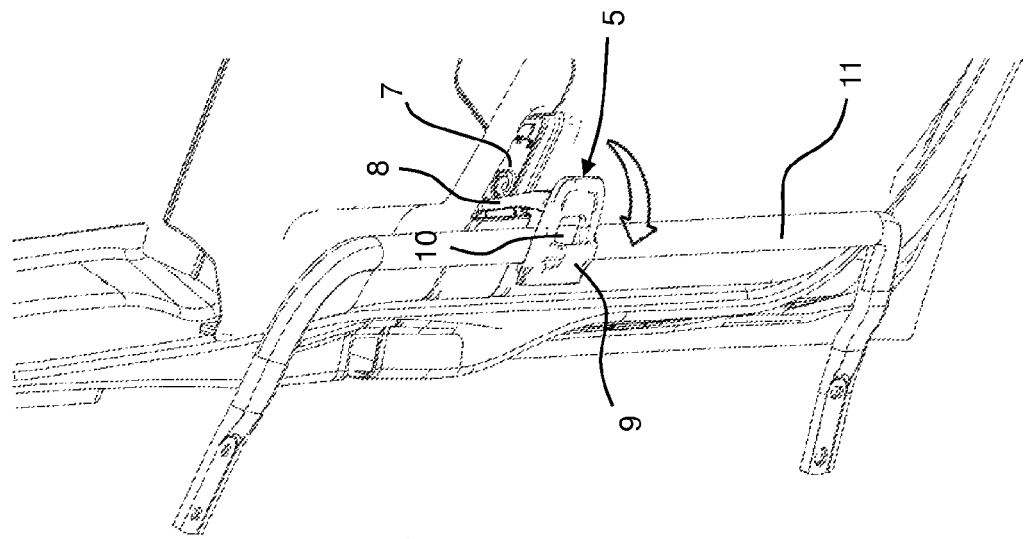
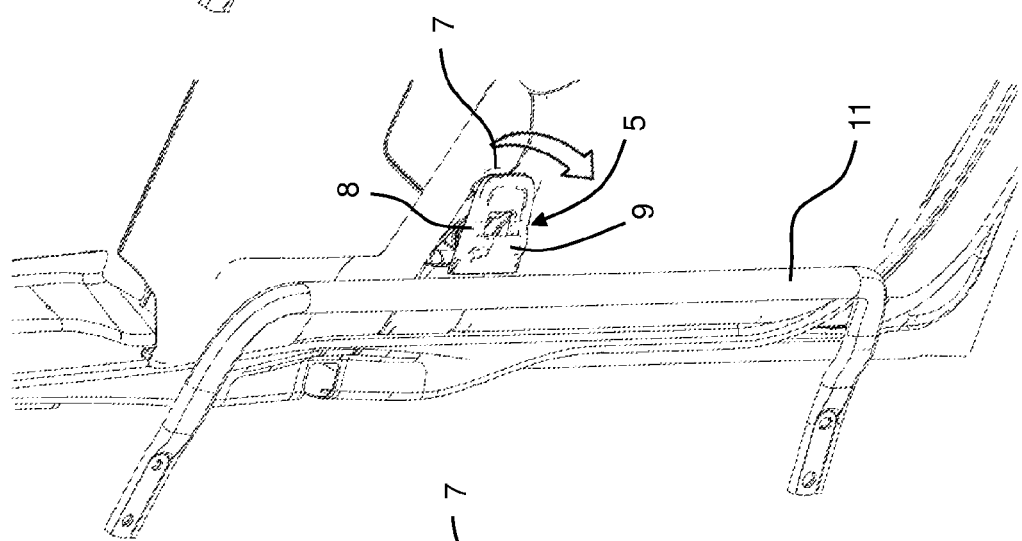
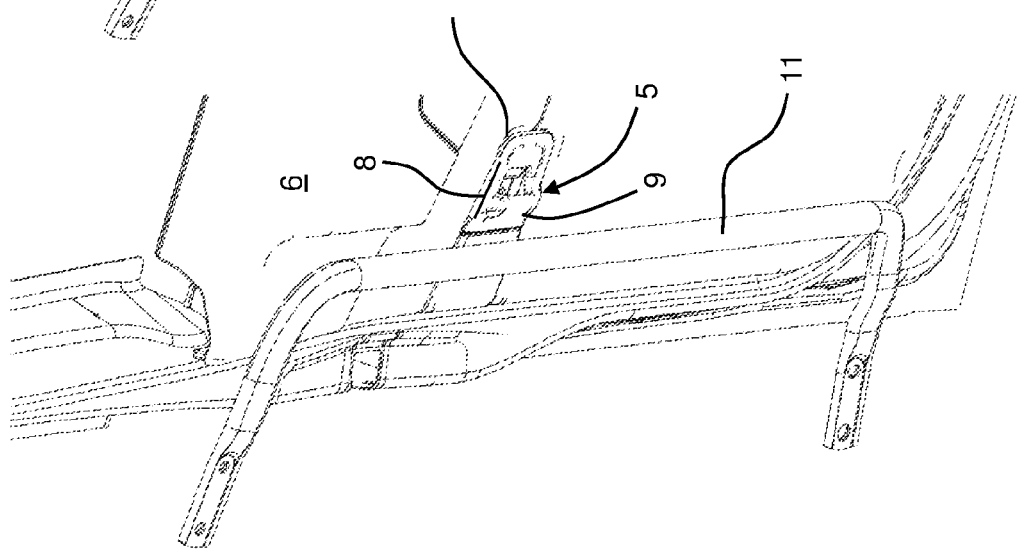

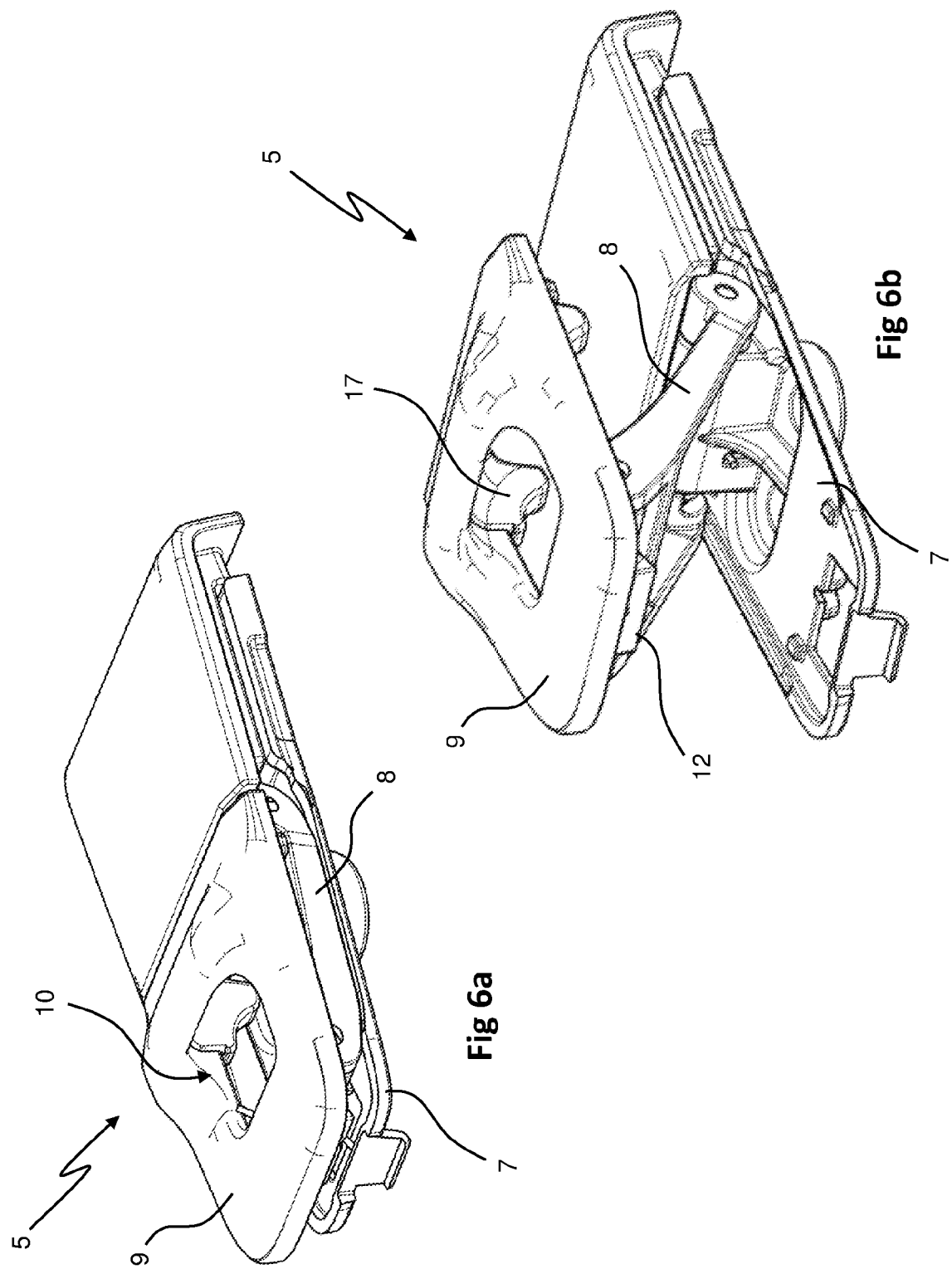

DOOR LOCKING DEVICE FOR LOCKING A VEHICLE DOOR

CROSS-REFERENCE TO RELATED APPLICATION(S)

This application is a national stage application (filed under 35 § U.S.C. 371) of PCT/SE2016/050519, filed Jun. 2, 2016 of the same title, which, in turn claims priority to Swedish Application No. 1550834-4, filed Jun. 17, 2015 of the same title; the contents of each of which are hereby incorporated by reference.

FIELD OF THE INVENTION

The present invention relates to a door locking mechanism/device for manually locking a vehicle door in a closed position and from inside. The invention is preferably intended for safely and easily locking a cab door on a heavy commercial/-industrial vehicle when the driver is going to rest/sleep inside the cab. The invention also covers a vehicle provided with a locking device according to the invention.

BACKGROUND OF THE INVENTION

Many heavy commercial vehicles, such as trucks, are intended for long-distance transportation and the driver may spend several days on the road and needs to rest and sleep in the vehicle. For security reasons the driver of course locks the cabin door when resting/sleeping using the conventional door locking system integrated in the side doors. Many such door locks are, however, possible to manipulate and break, for the initiated person, in such a way that the door can be opened from outside without a key. It has been more and more common that vehicles and drivers are exposed for assault, robbery and hijacking, e.g. when the driver is at sleep and caught off guard. This is a problem in many markets and there is a general desire to reduce/minimize this risk and it is very important that the driver feel safe inside the cab.

Several attempts have been done to make the conventional/integrated door lock safer but so far this has not really been successful. Doors have for example been strengthened by fitting protective plates to cover the inner components of the lock, but it has still been found difficult to make a really safe door lock. It is important that the driver trust the door lock, and also easily can see that the lock is activated. It is also convenient if the lock is easy to handle, i.e. user-friendly, as well as that the total weight of the lock and the door still is minimized and that the lock will not take up space in the cab compartment.

Many designs have been proposed to provide a simple and user-friendly solution to this problem.

In the patent document WO 2014/199191 is described a locking system for use in a vehicle installed inside the door of a truck. This locking system is located on the inside of the door and comprises a locking member movable between an unlocked position and a locked position. The locking system is designed with a receiving portion which is adapted to receive a solid element, e.g. a grab handle, fixed to the cabin frame. In the locked position the locking system retain the handle in the mechanism and the door cannot be opened from outside. This system is large and heavy and will be expensive to manufacture and install and comprises a number of parts that in time may result in malfunction.

In the patent document WO 2007/120040 is described a system for securing truck doors comprising U-shaped brackets or elements integrated in the door and that are gripping at least partly around a handle installed in the cab frame. The U-shaped bracket is provided with two holes in which a steel pin is inserted in such a way that the handle is anchored within the bracket. In this way the door is secured and cannot be opened from outside. The solution is not user-friendly as it will take some time to manipulate the parts included for locking and unlocking the door. The lock must be easy to handle as in same cases the driver may have to lock himself in or abandon the cab/vehicle urgently. The bracket will also take up some space in the cab compartment.

Still another solution is disclosed in US6619708. This patent document describes a door locking system for a vehicle cab having two opposed doors. The locking system includes a pair of links and shoe elements adapted to engage parts of the doors, e.g. handles, in such a way that it makes the doors immovable when the links are put together and tensioned. A toggle bolt assembly is provided between the links to tension them in order to pull the doors together and prevent their opening. This solution is relatively complicated to use and assemble and it comprises several parts not integrated into the vehicle.

Several similar solutions exist in the market but none of these prior known systems are as simple, easy and user-friendly as the present invention. The known systems have a number of disadvantages one of which is that they are designed with a relatively complex mechanism that requires a number of components or need several operational steps in order to use the system.

SUMMARY OF THE INVENTION

One object of the present invention is to solve the above mentioned problems and to propose a simple and fail-safe locking device that is easy to handle and that prevents unauthorized intrusion into the vehicle cab from outside.

A further object of the invention is that the system must take up minimal space in the cab and/or in the door panel.

A further object of the invention is that the locking device should be easy to build into normal vehicle doors without substantial modifications of door structure or door panel parts.

Another object of the invention is to provide a locking device containing as few and light weight components as possible.

Another object of the invention is to provide a locking device that can be easily checked if it is activated or inactivated.

A further object of the invention is that the system should be mechanically operated without any electric components thereby saving electrical power in the vehicle.

A further object of the invention is that the locking device should be fast, accurate and safe to handle.

A further object of the invention is that the locking device must not create noise/clutter, neither at maneuvering/activating the locking device, when driving the vehicle and/or at opening/closing the side doors.

A further object of the invention is that the locking device, at least in one embodiment, should be completely folded into the door panel when not activated.

The present invention refers to a locking device primarily intended for cab doors of heavy commercial/industrial vehicles and for locking the doors safely from inside the cab.

The locking device is, in one embodiment, fully integrated in the door trim panel in the region near a boarding handle, which in turn is installed in the framework of the cab. The locking device is manually pulled/folded out, and manoeuvred to hook around the boarding handle. The locking device is self-locking by means of springs and an integrated end stop and having a first and a second lever arm moved to a position around the boarding handle. The movement of the locking device, from its folded position into the door to the locked (activated) position, is made in one combined/consecutive movement.

The invention is based on the principle that the locking device is more or less hidden in the door panel until the driver wants to activate it. The driver than puts one or more fingers in a recess/grip in the devices outer second lever arm and pulls. The first and a second lever arm of the device simultaneously folds out in a predetermined manner and the second, outer, lever arm of the device is manually moved to and located around the boarding handle and come to rest against it, due to the fact that both the first and second lever arms are spring biased, striving to fold them into the locking devices inactivated position in the door panel.

An end stop arranged in the joint between the first and second lever arm prevents the lever arms from open more than about 90 degrees in relation to each other. This makes it impossible to stretch out the lever arms and release the second lever arm from the grip around the boarding handle, without first moving the second lever arm backward, and the door will therefore stay closed. When the driver wants to inactivate the locking device the driver needs to reverse the movements of the lever arms and fold the two lever arms into their housing in the door panel. After that the door, and its conventional lock, may be operated and the door could be opened in a normal manner.

The invention facilitates in this way that the user/driver easily may operate and activate the locking device whenever needed. The locking device is always in place in the door and is simply moved/activated by one hand or one finger.

By using a plastic or rubber element located on the outer end of the second, outer, lever arm, and positioned between the lever arm and the boarding handle, minimizes the risk of noise/clatter from the locking device when in use.

The system function is not dependent on any battery voltage, air or hydraulic pressure and the locking device prevents unauthorized opening of the cab door from outside. Due to the design the locking device takes up very little space in the cab and in the door.

The locking device is preferably manufactured of metal such as steel and the lever arms are arranged to partly rotate around two joints/axles, a first axle is arranged between the housing and the first lever arm and the second joint/axle is arranged between the first and second lever arm. The housing is firmly fixed to the door inner frame work.

Further features and advantages of the invention will be apparent from the following, more detailed description of the invention and the accompanying drawings and the claims.

BRIEF DESCRIPTION OF THE DRAWINGS

The invention is described below in some preferred embodiments illustrated in the accompanying drawings.

FIG. 4a-c illustrates, in perspective views, three different stages of the movement of the locking device, from the inactivated position to its activated position.

FIG. 6a illustrates in a perspective view the locking device in its folded inactivated position and FIG. 6b illustrates in a perspective view the locking device in a halfway lifted position.

DETAILED DESCRIPTION

The present invention thus relates to a locking device for locking vehicle doors safely from the inside. The locking device may be fully integrated in the door panel and preferable located near a boarding handle that in turn is installed in the framework of the cab.

Figure 1:
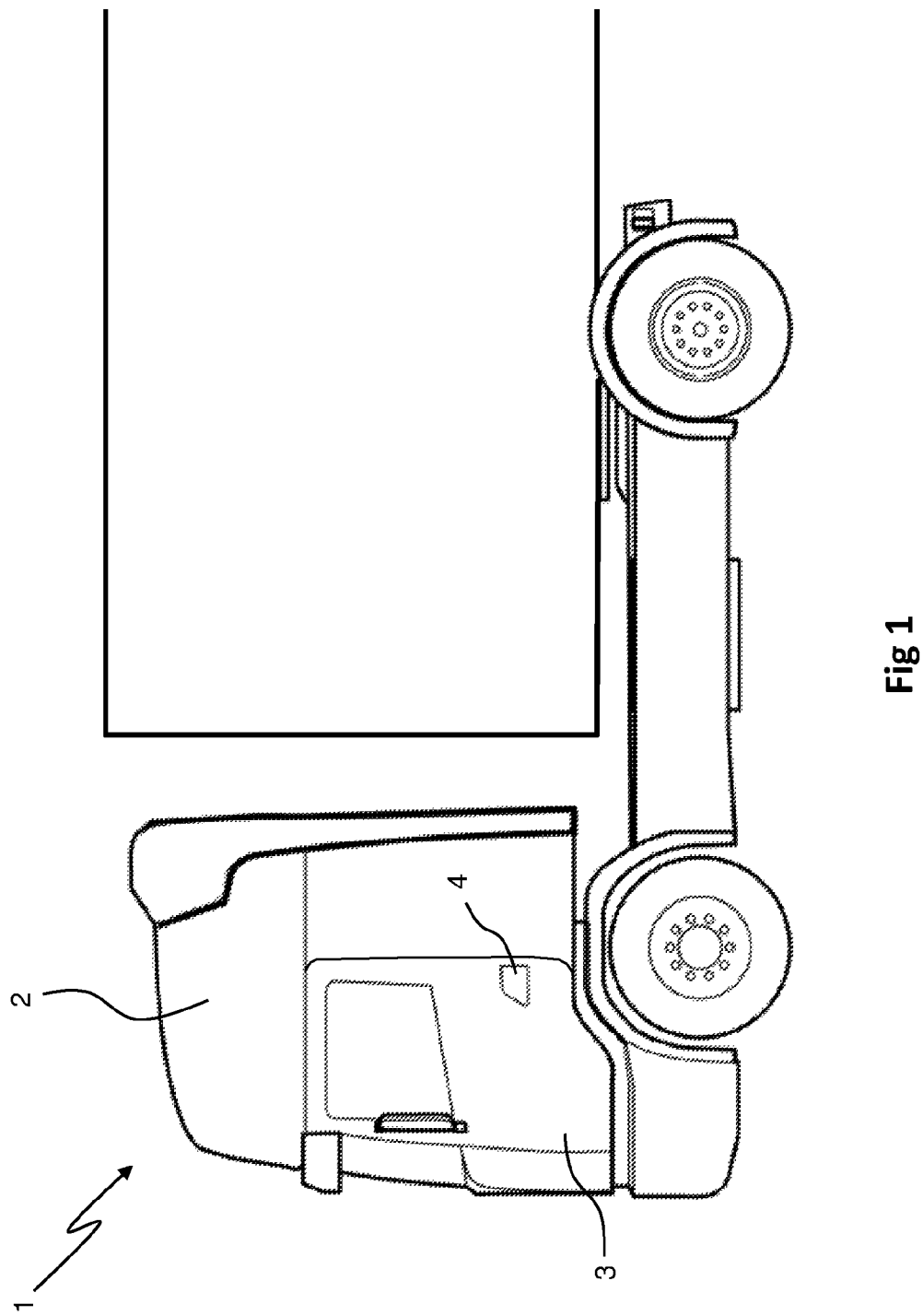
FIG. 1 illustrates a perspective side view, of a conventional truck and its cabin provided with side doors.

FIG. 1 illustrates a perspective side view of a truck 1 provided with a drivers cabin 2 having side doors 3. The doors are provided with conventional door locks 4. For safety reasons a further locking device 5 is installed on the inside of the doors (see FIG. 2).

Figure 2:
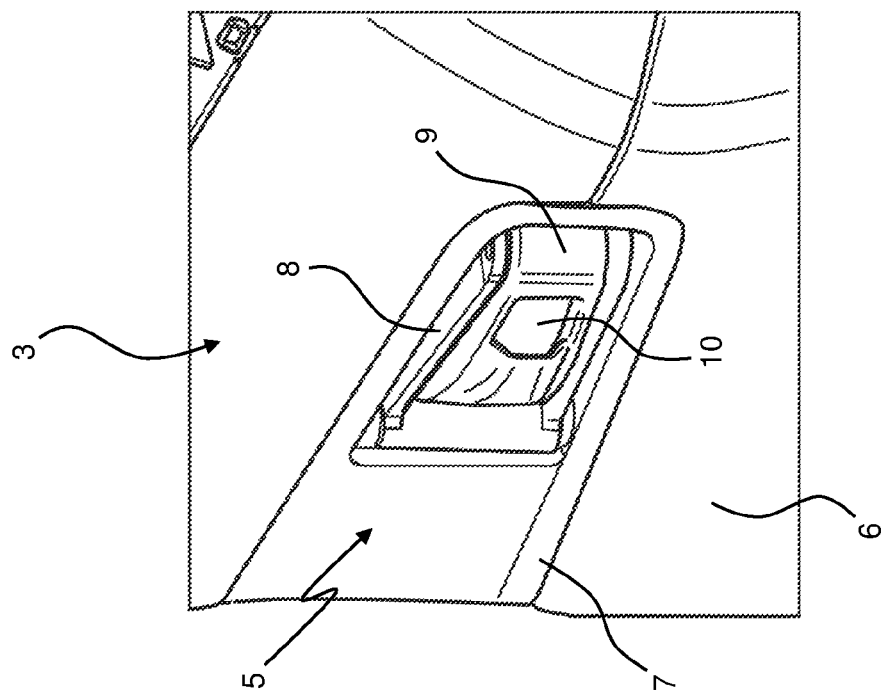
FIG. 2 illustrates the locking device according to the invention, installed on the inside of the cab door, in the rear part of the trim panel of the door and is shown in its inactivated position.

FIG. 2 illustrates the locking device 5 in an inactivated position, according to the invention, installed on the inside of the cab door 3 and recessed in the rear part of the trim panel 6 of the door 3, near the conventional door lock (see FIG. 1). The locking device 5 is inserted into the panel 6 by means of a housing 7 mounted to the framework in the door 3 (not shown). In this way no parts take up space outside the door panel 6 in the cab compartment. The locking device 5 comprises movable locking members a first and a second lever arm 8,9, partly rotatable around joints/-axles (see FIGS. 5a-c). In the second lever arm 9 a recess 10 is arranged, into which one or more fingers can be inserted. In this way it will be possible to pull the lever arms out of the housing 7 and the door panel 6. The lever arms 8,9 are spring biased (see FIGS. 5a-c) and is striving to be folded into the housing 7, and into the door panel 6.

Figure 3:
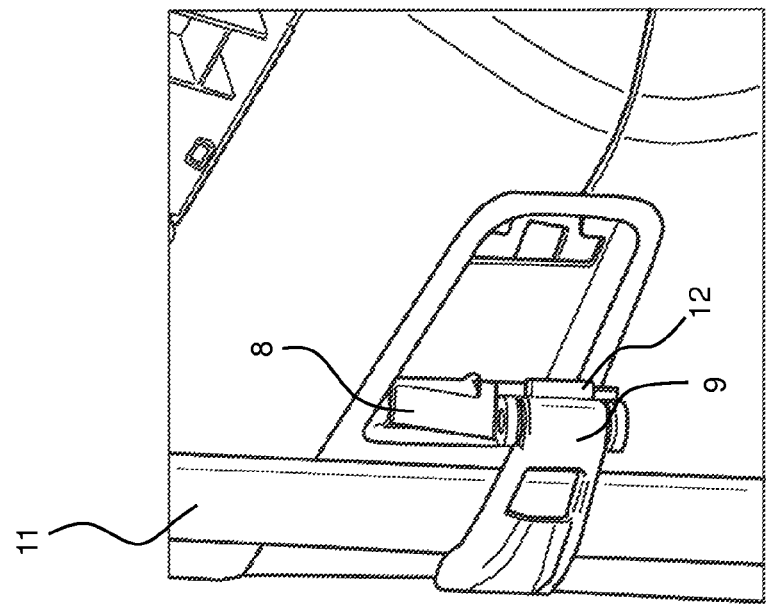
FIG. 3 illustrates more in detail, in a perspective view, the activated locking device, here gripping around a boarding handle mounted in the framework of the cab.

FIG. 3 illustrates in more detail, and in a perspective view, the activated locking device 5. The lever arms 8,9 have here been pulled out and advanced against a boarding handle 11 and have been located around the boarding handle 11 mounted in the frame work of the cab (not shown). The lever arms 8,9 of the locking device 5 are spring biased and strive to move back into the housing 7. Of this reason the locking device 5 will maintain its grip around the boarding handle 11. Due to an end stop 12 arranged on the second lever arm 9 the angle between the two lever arms 8,9 can never exceed a predetermined angle, e.g. about 90 degrees in relation to each other. Of this reason it will be impossible to stretch out the lever arms 8,9, releasing the second lever arm 9 from the grip onto the boarding handle 11, without first moving the second lever arm 9 backwards, and the cab door 3 will stay closed.

FIG. 4a-c illustrates in perspective views three different stages of the movement of the locking device 5, from the inactivated position to the activated position. In FIG. 4a the locking device 5 is illustrated in its inactivated unlocked position, and the lever arms 8,9 are folded into the housing 7 installed in the door panel 6. In FIG. 4b the lever arms 8,9 are being pulled out from the housing 7 in a movement towards the boarding handle 11. In FIG. 4c the locking device 5 has been hooked around the boarding handle 11 preventing the cab door 3 to be opened from outside.

Figure 5C:
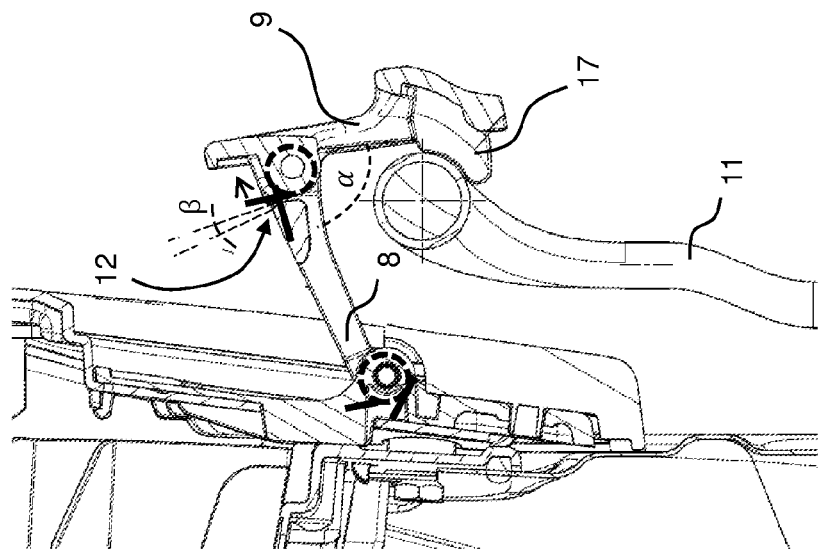
FIG. 5a-c illustrates principally the same stages as FIG. 4a-c but from above and partly in cross-section.
Figure 5B:
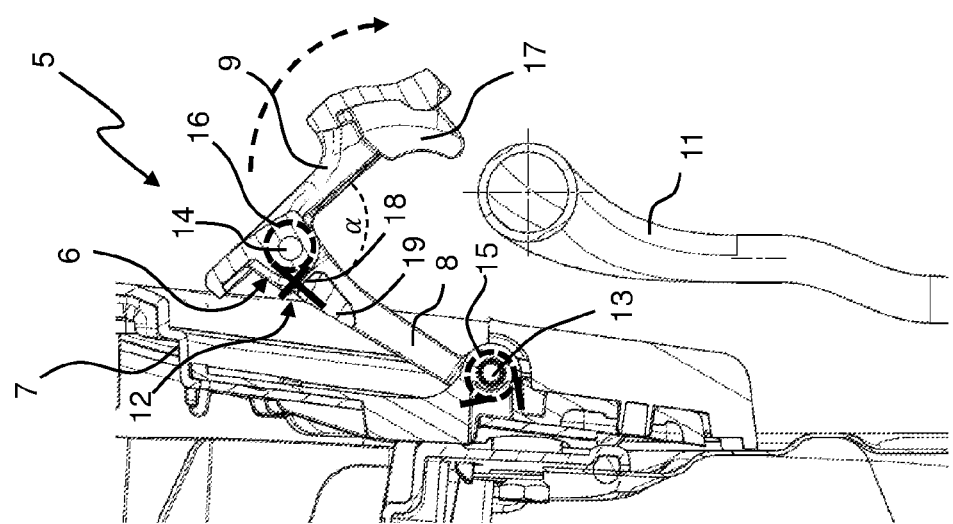
Figure 5A:
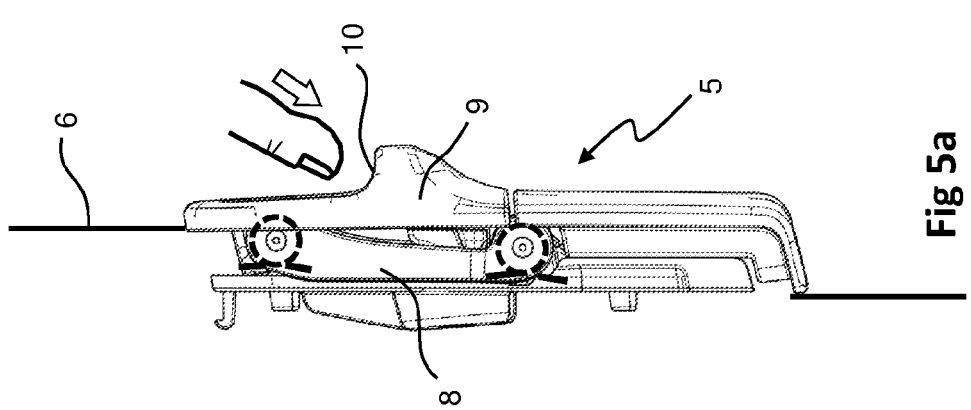

FIG. 5a-c illustrates the same stages as FIG. 4a-c but in more detail and in cross-section views. In FIG. 5a the locking device 5 is shown in its folded inactive position, mainly inside the door panel 6. When the driver wants to activate the locking device 5 his finger is inserted into the recess 10 of the second lever arm 9, and the lever arms 8,9 are pulled outwardly. FIG. 5b illustrates a second stage in the movement where the lever arms 8,9 are "opened" and folded out in order to pass and surround the boarding handle 11. The first lever arm 8 is partly rotatable connected, at one inner end, by a first joint/hinge 13, to the housing 7 of the locking device 5 and the second lever arm 9 is partly rotatable connected by a second joint/hinge 14 to the first lever arms 8 outer end. A first spring 15, e.g. a coil spring, is arranged in the first joint/hinge 13 striving to keep the first lever arm 8 against or in the housing 7. A second spring 16 is arranged in the second joint/hinge 14 striving to keep the second lever arm 9 against or in level with the first lever arm 8 and/or in the housing 7.

In this figure also a plastic or rubber element 17 is illustrated as well as the end stop 12 of the second lever arm 9. The end stop 12 is arranged near the second joint/hinge 14 comprising a heel 18 arranged on the second lever arm 9 abutting a crutch 19 arranged on the first lever arm 8. The first and second lever arm 8,9 could open up to about 100 degrees in relation to each other, but preferable about 90 degrees, restricted by the end stop 12.

In the FIG. 5b is illustrated how the second lever arm 9 is folded out to about its most open position, having its largest angle α in relation to the first lever arm 8, as the end stop 12 prevents a larger opening angle α between the two lever arms 8,9. In this way the second lever arm 9 may pass the handle 11 and hook to it, as can be seen in FIG. 5c. In this position the second lever arm 9 has a somewhat smaller angle α in relation to the first lever arm 8, due to an angular play β in the end stop 12. In an attempt to break into the cab the door 3 will only open a couple of degrees before the end stop 12 is activated and will stop further opening of the door 3. The springs 15,16 may be coil or torsion springs.

FIG. 6a illustrates in a perspective view the locking device 5 in its folded inactivated position and in FIG. 6b the locking device 5 is in a somewhat lifted position. The first and second lever arms 8,9 are located on/in a housing 7 which in turn is installed into the doors framework (not shown). In the second lever arm 9 a recess 10 is arranged. In FIG. 6b the locking device 5 is half way pulled out from the housing 7 on the way to an activated position. The end stop 12 is arranged between the first and second lever arms 8,9 and the plastic or rubber element 17, for abutting the boarding handle 11 (see FIG. 7) is illustrated.

Figure 7:
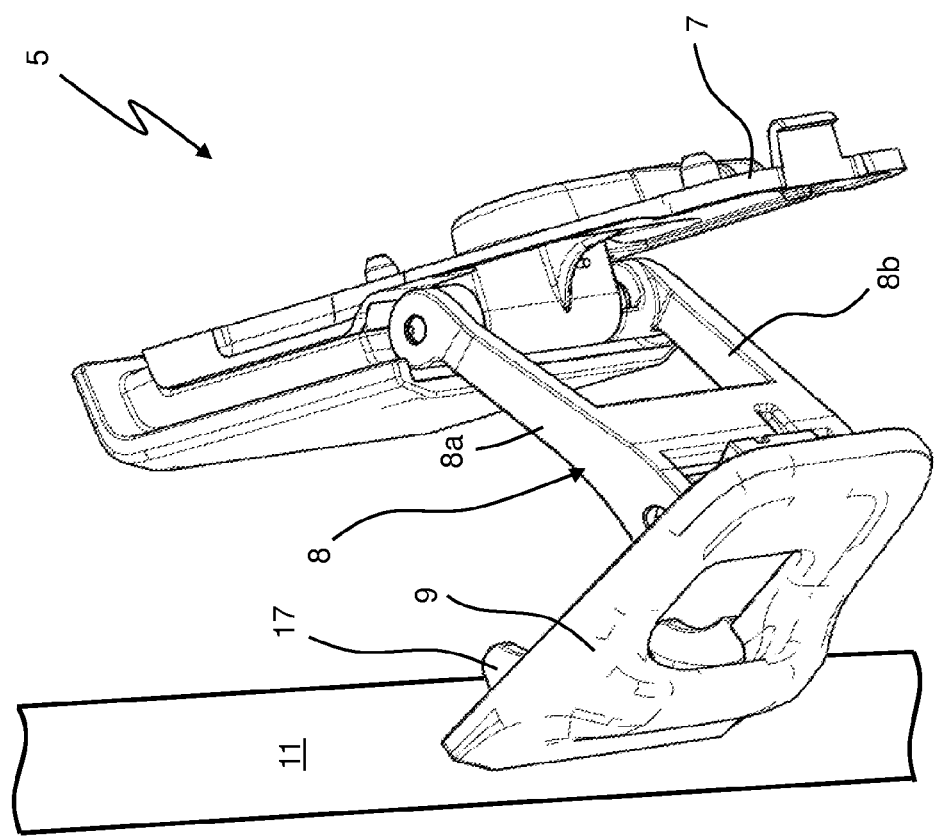
FIG. 7 illustrates in a perspective view from another angle, the locking device in a position on the way to hook around the boarding handle.

FIG. 7 illustrates in a perspective view, from an angle obliquely from above, the locking device 5 in a position on the way to hook around the boarding handle 11. The second lever arm 9 is just to be positioned around the handle 11. The second lever arm is provided with two legs (8a,b) in order to improve its stability.

The locking device according to the invention will be fast and easy to handle by that it requires very few operational steps for maneuvering and unfold the locking lever arms 8,9. The locking device 5 can be controlled with only one hand and the design takes up very little space in its inactivated storage position.

The above description is primarily intended to facilitate the understanding of the invention. However the invention is of course not in any way restricted or confined to only the disclosed embodiments, but many possibilities to modifications would be apparent to a person skilled in the art within the scope of the invention without departing from the basic idea of the invention, as defined in the claims set out below.

The invention claimed is:

1. A door locking system for locking a vehicle door from inside, comprising:
    a door locking device comprising:
        a housing;
        a first lever arm partly rotatable connected at one end by a first joint or hinge to the housing;
        a second lever arm partly rotatable connected by a second joint or hinge to an opposed end of the first lever arm and comprising a recess by which the first lever arm and the second lever arm may be pulled out;
        a first spring arranged in the first joint or hinge and configured to bias the first lever arm to or in the housing; and
        a second spring arranged in the second joint or hinge and configured to bias the second lever arm against or in level with the first lever arm and/or in the housing; and
    a locking handle rigidly mounted to a framework of the vehicle and is located inwardly from the housing of the door locking device,
    wherein the second lever arm is configured such that it can be:
        operated, from a folded, inactivated unlocked position on or in the housing or vehicle door, by a user or driver; and
        connected to or hooked around the locking handle in an activated locked position,
        wherein the locking handle is located inwardly from the housing of the door locking device such that the second lever arm, in the activated locked position, is located in an extended position from the housing and connected to or hooked around the locking handle.

2. A door locking system according to claim 1, wherein the locking handle is a boarding handle.

3. A door locking system according to claim 2, wherein the boarding handle is arranged near the vehicle door and the door locking device, making it possible to connect to or hook the door locking device around the boarding handle by the first lever arm and the second lever arm.

4. A door locking system according to claim 1, wherein an end stop is arranged between the first lever arm and the second lever arm thereby restricting a possible opening angle between the first lever arm and the second lever arm and thereby restrict the vehicle door from opening when the door locking device is activated.

5. A door locking system according to claim 4, wherein the end stop is arranged at the second joint or hinge and comprises a heel arranged on the second lever arm abutting a crutch arranged on the first lever arm.

6. A door locking system according to claim 1, wherein said housing is arranged in the vehicle door.

7. A door locking system according to claim 1, wherein the first lever arm and the second lever arm are visible to the user or driver as installed in the vehicle door, both in the unlocked position as well as in the locked position.

8. A door locking system according to claim 1, wherein the first spring and the second spring are coil springs.

9. A door locking system according to claim 1, wherein the first spring and the second spring are torsion springs.

10. A door locking system according to claim 1, wherein a plastic or rubber element is arranged on the second lever arm for improving a grip to the locking handle and reducing possible noise from the door locking device when used.

11. A door locking system according to claim 1, wherein the first lever arm is arranged with two legs.

12. A door locking system according to claim 1, wherein the first lever arm is located behind the second lever arm when the door locking device is inactivated and folded into the vehicle door.

13. A door locking system according to claim 1, wherein the first lever arm and the second lever arm can be opened to about 100 degrees in relation to each other, and are restricted by an end stop arranged between the first lever arm and the second lever arm.

14. A door locking system according to claim 1, wherein said housing is recessed into a door panel of the vehicle door.

15. A door locking system according to claim 1, wherein the first lever arm and the second lever arm can be opened to about 90 degrees in relation to each other, and are restricted by an end stop arranged between the first lever arm and the second lever arm.

16. A vehicle comprising a door locking system for manually or physically locking a vehicle door from inside, said door locking system comprising:
   a door locking device comprising:
      a housing;
      a first lever arm partly rotatable connected at one end by a first joint or hinge to the housing;
      a second lever arm partly rotatable connected by a second joint or hinge to an opposed end of the first lever arm and comprising a recess by which the first lever arm and the second lever arm may be pulled out;
      a first spring arranged in the first joint or hinge and configured to bias the first lever arm to or in the housing; and
      a second spring arranged in the second joint or hinge and configured to bias the second lever arm against or in level with the first lever arm and/or in the housing; and
   a locking handle rigidly mounted to a framework of the vehicle and is located inwardly from the housing of the door locking device,
   wherein the second lever arm is configured such that it can be:
      operated, from a folded, inactivated unlocked position on or in the housing or vehicle door, by a user or driver; and
      connected to or hooked around the locking handle in an activated locked position,
      wherein the locking handle is located inwardly from the housing of the door locking device such that the second lever arm, in the activated locked position, is located in an extended position from the housing and connected to or hooked around the locking handle.

17. A vehicle according to claim 16, wherein the locking handle is a boarding handle.

18. A vehicle according to claim 17, wherein the boarding handle is arranged near the vehicle door and the door locking device, making it possible to connect to or hook the door locking device around the boarding handle by the first lever arm and the second lever arm.

19. A vehicle according to claim 16, wherein an end stop is arranged between the first lever arm and the second lever arm thereby restricting a possible opening angle between the first lever arm and the second lever arm and thereby restrict the vehicle door from opening when the door locking device is activated.

20. A vehicle according to claim 19, wherein the end stop is arranged at the second joint or hinge and comprises a heel arranged on the second lever arm abutting a crutch arranged on the first lever arm.

* * * * *